March 24, 1936. W. E. YUNKER 2,035,416
VEHICLE
Filed April 7, 1934 3 Sheets-Sheet 1

Inventor
W. E. Yunker
by
Attorney

March 24, 1936.　　　W. E. YUNKER　　　2,035,416
VEHICLE
Filed April 7, 1934　　　3 Sheets-Sheet 2
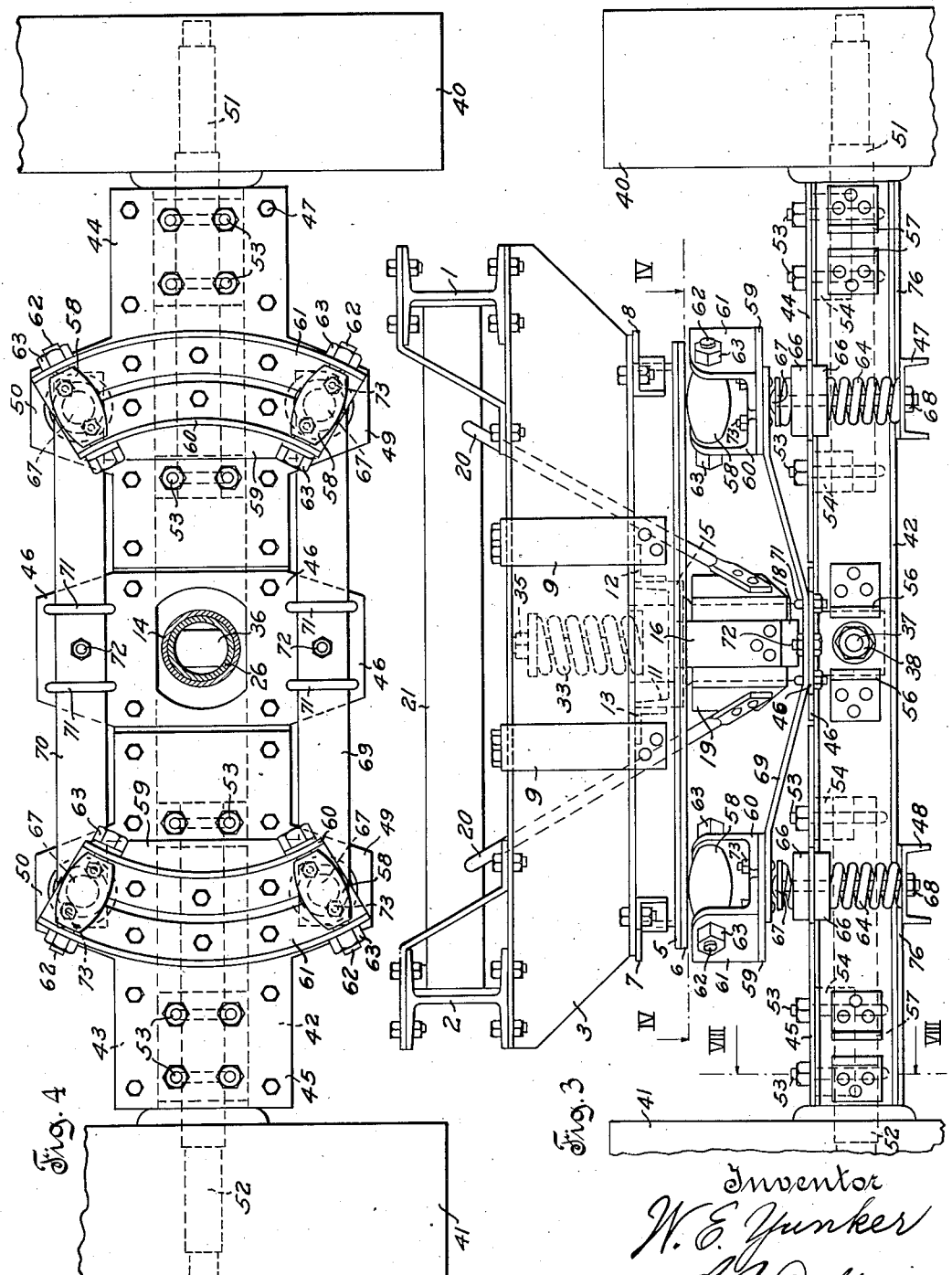

March 24, 1936.   W. E. YUNKER   2,035,416
VEHICLE
Filed April 7, 1934   3 Sheets-Sheet 3
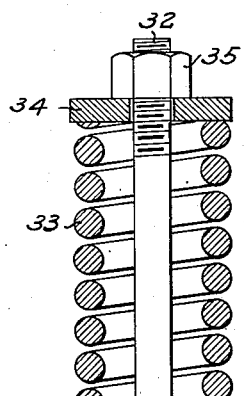
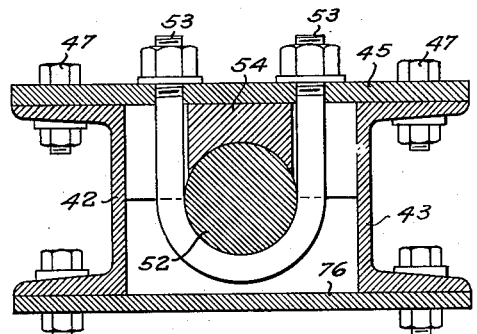
Fig. 8
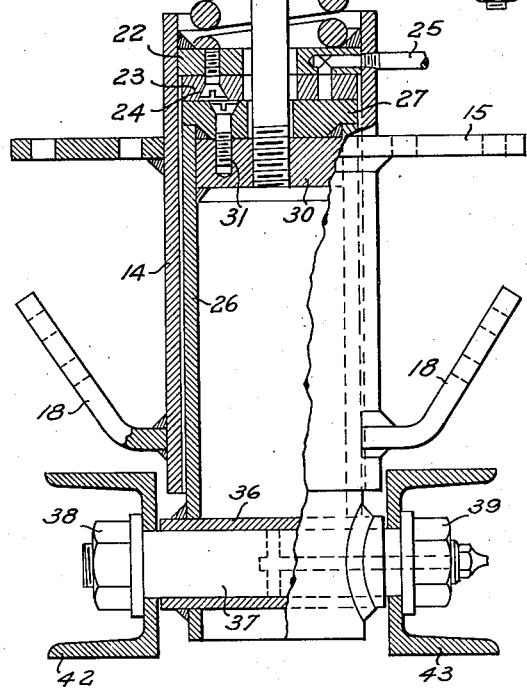
Fig. 5
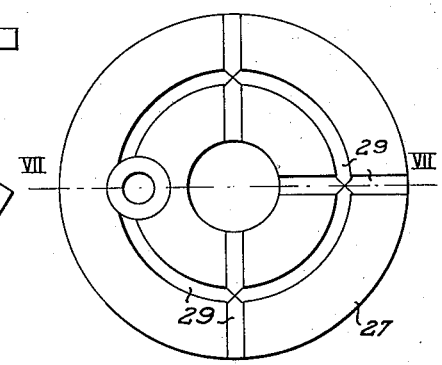
Fig. 6
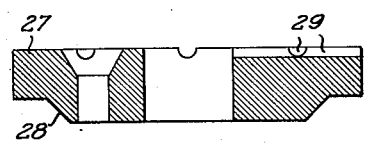
Fig. 7
Inventor
W. E. Yunker
by
Attorney Patented Mar. 24, 1936

2,035,416

UNITED STATES PATENT OFFICE 2,035,416

VEHICLE

William E. Yunker, Springfield, Ill., assignor to Allis-Chalmers Manufacturing Company, Milwaukee, Wis., a corporation of Delaware Application April 7, 1934, Serial No. 719,469

22 Claims. (Cl. 280—110)

This invention relates to vehicles having a running gear of the swivel truck type, and it is an object of the invention to provide a vehicle of this character in which the swivel truck running gear cooperates with the main frame of the vehicle in an improved manner which avoids the setting up of undue stresses in the running gear and main frame if the vehicle travels over uneven ground but which affords nevertheless a certain stability of the main frame on the swivel truck running gear.

A construction permitting a cooperation of this kind between the main frame and the swivel truck running gear has been found particularly desirable in vehicles which are intended to carry a heavy load off center, that is, a load which tends to tilt the main frame relative to the running gear transversely to the direction of propulsion, and it is in vehicles of this type where the invention may be used with particular advantage. Graders, and in particular elevating graders, are examples of vehicles which are subject to the mentioned unfavorable load distribution and in which the invention may be used, but it is not intended to limit the invention to this class of vehicles.

Another object of the invention is to provide a vehicle in which the main frame is supported on a swivel truck running gear through a connection which permits, in addition to the usual pivotal movements of the running gear about a vertical axis, angular displacements of the running gear with respect to said vertical axis, and in which resilient means are interposed between the main frame and the running gear, independently of said connection, for holding the running gear resiliently in a predetermined angular relation to its vertical axis of pivotal movement.

Another object of the invention is to provide improved means for resiliently holding a running gear of the swivel truck type in a predetermined angular relation to its vertical axis of pivotal movement.

Still another object of the invention is to provide an improved swivel mechanism for connecting the main frame and the running gear of a vehicle.

These and other objects and advantages of the invention will be apparent from the following description. A clear conception of an embodiment of the invention and of the operation of a device constructed in accordance therewith, may be had by referring to the drawings accompanying and forming a part of this specification, in which like reference characters designate the same or similar parts in the several views.

Fig. 3 is a front view of the vehicle front end shown in Fig. 2.

Fig. 4 is a view taken on line IV—IV of Fig. 3.

Fig. 5 is a detail view, partly in section, of the swivel mechanism connecting the running gear and main frame shown in Figs. 1 to 4.

Figs. 6 and 7 are detail views of one of the thrust plates shown in Fig. 5.

Fig. 8 is a section on line VIII—VIII of Fig. 3.

Figure 2:
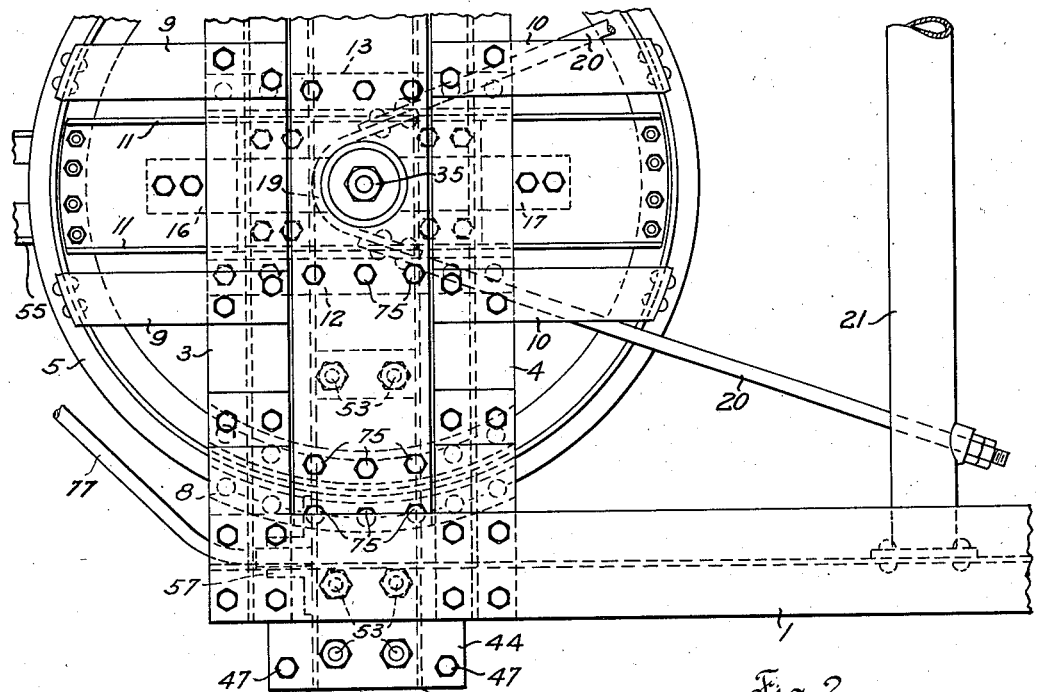
Fig. 2 is a top view of the front end of the vehicle shown in Fig. 1, the wheel and adjacent portions of the running gear and main frame at the right hand side of the vehicle, with reference to the direction of propulsion, being omitted.

The main frame of the vehicle comprises side sills 1 and 2 extending in the direction of propulsion, and two transverse beams 3 and 4 connecting the forward ends of the side sills. The rear end of the vehicle, which has not been shown, may be constructed in any conventional manner depending on the purpose for which the vehicle is to be used. For instance, if the vehicle is to be an elevating grader the rear end of the main frame will be supported on rear wheels which are mounted on a transverse rear axle, and the rear axle will preferably be secured to the main frame in a vertically fixed position so that the overhanging weight of the elevator is directly transmitted from the main frame upon the rear axle.

Secured to the under side of the transverse beams 3 and 4 is a circular roller track consisting of a circle frame 5 and a circular wear plate 6 secured to the circle frame 5. The circle frame 5 is secured to the beams 3 and 4 by means of angle irons 7 and 8 bent into arcuate shape and secured to the lower flanges of the beams 3 and 4, and by means of brace straps 9 and 10 secured to the upper flanges of the beams 3 and 4, the brace straps 9 extending forwardly and downwardly from the beam 3 and the brace straps 10 extending rearwardly and downwardly from the beam 4. Mounted diagonally within the circle frame 5 and extending in the longitudinal direction of the vehicle is a channel 11 which is positioned so as to present its open side to the beams 3 and 4. Straight angle irons 12 and 13 are secured to the flanges of the channel 11 below the beams 3 and 4, and the angle irons 12 and 13 in turn are secured to the lower flanges of the beams 3 and 4. Extending in the plane of and between the lower flanges of the transverse beams 3 and 4 is a plate 74 which is bolted to the horizontal flanges of the arcuate angle irons 7 and 8 and to the horizontal flanges of the straight angle irons 12 and 13, by means of bolts 75, the bolts 75 being shown in Fig. 2 but omitted in Fig. 1 for the sake of clearness. The channel 11 serves as a support for the stationary part of the swivel mechanism more clearly shown in Fig. 5.

Figure 1:
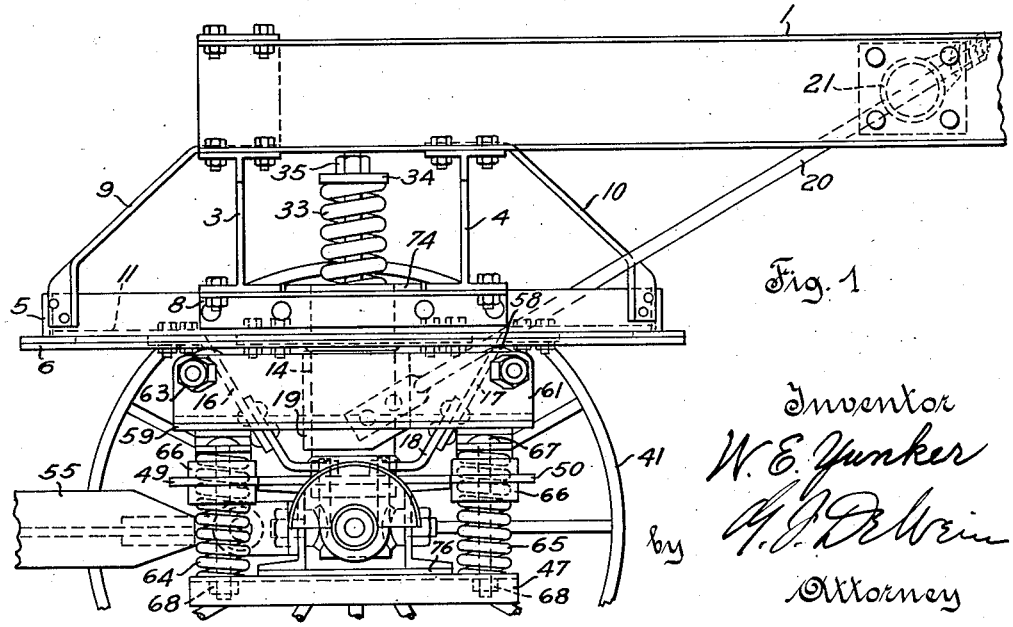
Fig. 1 is a side view of the front end of a vehicle having a swivel truck running gear, the near wheel of the running gear being omitted.

The stationary part of the swivel mechanism comprises a tube 14 to which is secured, for instance by welding, a mounting plate 15 extending in a plane at right angles to the axis of the tube. The plate 15 bears against the under side of the web of channel 11 and is secured thereto by means of bolts as shown in Fig. 1. The upper end of the tube 14 projects through central holes in the web of channel 11 and plate 74, and the lower end of the tube is braced against the channel 11 by means of straps 16 and 17 secured to plates 18 on the lower end of the tube 14 and to the web of channel 11 forwardly and rearwardly of plate 15. Placed around the tube 14 between the upper plate 15 and the lower plate 18 is a bent plate 19 to which tension rods 20 are secured. The bent plate 19 is secured to the tube 14, preferably by welding, and the tension rods are connected at their rear ends to a transverse tube 21 extending between and secured to the side sills 1 and 2. Within the tube 14 and near the upper end thereof is a washer 22 which is secured to the tube, preferably by welding, the washer having a hole concentric with the axis of the tube. The washer 22 serves as a support for a thrust washer 23 which likewise has a hole at its center and which bears against the lower surface of washer 22. A screw 24 holds the washer 23 secured to the washer 22, and a pipe 25 communicates with suitably arranged bores in washer 22 and thrust washer 23 for purposes of lubrication.

The movable part of the swivel mechanism comprises a tube 26 telescopically and rotatably arranged within the tube 14. On the upper circular edge of the tube 26 rests a thrust washer 27 which has a plane upper surface for cooperation with the lower surface of thrust washer 23, and a conical portion 28 projecting into the tube 26. Grooves 29 are provided in the thrust washer 27 for proper distribution of lubricant applied through the pipe 25 and the bores in washer 22 and thrust washer 23. Secured within the tube 26, preferably by welding, and below the conical portion 28 of thrust washer 27 is a washer 30 to which the thrust washer 27 is secured by means of a screw 31. A rod 32 extending in the direction of the axis of tubes 14 and 26 passes through the central holes in washers 22 and 23 and through a central hole in thrust washer 27 and is screwed with its lower end into the washer 30. The rod 32 is surrounded by a coil spring 33 which is seated with its lower end on the washer 22 and which is engaged at its upper end by a washer 34, the washer 34 abutting against a nut 35 which is screwed upon the threaded upper end of rod 32. The spring 33 permits, under extreme conditions, telescopic movement of the tube 26 within the tube 14. The tube 26 carries at its lower end, below the lower end of tube 14, a sleeve 36 which extends through opposite holes in the wall of the tube and is secured thereto, preferably by welding, the axis of the sleeve 36 being disposed at right angles to the axis of tube 26. The sleeve 36 rotatably supports a pin 37 which has a cylindrical surface cooperating with the inner surface of sleeve 36, the length of the cylindrical surface of pin 37 being somewhat greater than the length of sleeve 36, and opposite end portions of the pin are threaded for the reception of nuts 38 and 39. For purposes of applying lubricant to the cooperating surfaces of pin 37 and sleeve 36 the pin has an axial and a diametrical bore and a fitting at the outer end of the axial bore.

The running gear comprises an axle structure supported on a pair of wheels 40 and 41. The axle structure is made up of a pair of cross channels 42 and 43 extending parallel to each other forwardly and rearwardly of the common axis of the wheels, and held together by a pair of upper plates 44 and 45 and a central plate 46, all bolted to the upper flanges of the cross channels by bolts 47, a lower plate 76 and a pair of channel irons 47 and 48 secured to the cross channels from below. The bolts 47 are shown in Figs. 2, 4 and 8 but have been omitted in Figs. 1 and 3 for the sake of clearness. The plates 44 and 45 are alike and each has a forward extension 49 and a rearward extension 50 projecting beyond the forward and rearward edges of the cross channels 42 and 43. The central plate 46 likewise projects beyond the forward and rearward edges of the cross channels 42 and 43. The wheels 40 and 41 are mounted on stub axles 51 and 52 which are secured by means of U-bolts 53 and pillow blocks 54 to the plates 44 and 45 from below. The axle structure is pivotally connected to the swivel mechanism by means of the pin 37 on which the cross channels 42 and 43 are retained by means of the nuts 38 and 39 and washers as shown in Fig. 5. A draft pole 55 is pivotally connected to the forward cross channel 42 by means of brackets 56 which are secured to the web of the channel at opposite sides of the nut 38, and similar brackets 57 are mounted at the ends of the channel adjacent to the wheels 40 and 41 for the reception of braces 77 which hold the draft pole in a predetermined angular relation to the common axis of the wheels.

The wear plate 6 of the circle frame 5 cooperates with rollers 58 of which there are two pairs, one pair at each side of a vertical plane passing in the longitudinal direction of the vehicle through the common axis of the tubes 14 and 26. The rollers are barrel shaped or ovoid, having convex circumferential surfaces, and are rotatable on axes disposed radially with respect to the common axis of the tubes 14 and 26. Each pair of rollers is mounted in a bracket comprising a base plate 59 and arcuate angle irons 60 and 61 bolted to the base plate. The upstanding flanges of the angle irons carry pins 62 which extend radially with respect to the common axis of the tubes 14 and 26, the pins rotatably supporting the rollers 58 and being retained on the angle irons 60 and 61 by nuts 63. Underneath the roller bracket between the swivel mechanism and the wheel 40 (Fig. 3) a forward coil spring 64 and a rearward coil spring 65 (Fig. 1) are arranged, the coil springs being seated with their lower ends on the channel iron 47 which projects forwardly and rearwardly from the cross channels 42 and 43. Another pair of forward and rearward coil springs 64 and 65 is arranged underneath the roller bracket between the swivel mechanism and the wheel 41, this second pair of coil springs being seated on the channel iron 48. The coil springs extend upwardly through suitable holes in the forward and rearward projections 49 and 50 of the plates 44 and 45, the projections carrying collars 66 surrounding the springs. Axially extending through each coil spring is a bolt 67 having a carriage bolt head engaging a washer placed on the upper end of the coil spring. The bolts 67 extend through the webs of channels 47 and 48 and carry nuts 68 which engage the webs from below. In addition to the forward and rearward coil springs 64 and 65 the axle structure carries forward and rearward leaf springs 69 and 70 which are mounted on the forwardly and rearwardly projecting portions of the central plate 46 by means of U-bolts 71 and screw bolts 72. The ends of the leaf springs are bent to lie flat against the bottom surfaces of the base plates of the roller brackets and are secured thereto by means of bolts and nuts 73. The heads of the bolts 67 bear against the ends of the leaf springs.

In operation the axle structure may be turned for steering purposes about the common axis of the tubes 14 and 26, and while traversing uneven ground, the axle may rock about the axis of pin 37. Such rocking movements will result in compression of the forward and rearward coil springs at the side of the upwardly moving wheel, and in a corresponding deflection of the forward and rearward leaf springs. Under extreme conditions the coil springs may be compressed so far that they become solid and a further upward displacement of the upwardly moving wheel will result in a downward pull on the inner tube 26. The spring 33 will yield under such downward pull and allow telescopic movement of the tube 26 within the tube 14. Under normal conditions the main frame is stabilized, to a certain extent, on the axle structure by the rollers 58 which provide four points of support in addition to the main support afforded by the tube 26 with its upper thrust washer 27 bearing against the thrust washer 23. The bolts 67 and nuts 68 permit adjustment of the initial tension of the coil springs 64 and 65, and similarly the rod 32 and nut 35 permit adjustment of the initial tension of the spring 33.

It should be understood that it is not intended to limit the invention to the exact details of construction herein shown and described, for various modifications within the scope of the claims may occur to persons skilled in the art. For instance, as a possible modification of the construction shown in the drawings the coil springs 64 and 65 may be omitted and the leaf springs 69 and 70 may be made strong enough, preferably by the use of additional leaves, so as to give sufficient support to the roller brackets. Another possible modification would be to mount the circle frame and wear plate on the axle structure and the rollers on the main frame or, in other words, to reverse the location of these parts with respect to the main frame and the axle structure or subframe.

It is claimed and desired to secure by Letters Patent:

1. In a vehicle, a main frame, a wheel supported subframe, means supporting said main frame on said subframe and pivotally connecting the latter to said main frame for steering and transverse rocking movements about a center in horizontally fixed relation to said main frame, and means interposed between said main frame and said subframe for resiliently holding said subframe in a predetermined angular relation to a vertical axis through said center, said interposed means including an abutment on one of said frames, elements bearing against said abutment, and means for mounting said elements on the other frame at opposite sides of said vertical axis, said mounting means retaining said elements resiliently for relatively independent yielding movements relative to the frame on which they are mounted.

2. In a vehicle, a main frame, a wheel supported subframe, means supporting said main frame on said subframe and pivotally connecting the latter to said main frame for steering and transverse rocking movements about a center in horizontally fixed relation to said main frame, and means interposed between said main frame and said subframe for resiliently holding said subframe in a predetermined angular relation to a vertical axis through said center, said interposed means including a circular roller track arranged on one of said frames concentrically with said vertical axis, roller elements disposed at opposite sides of said vertical axis and engaging said track, and means for mounting said roller elements on the other frame, said mounting means sustaining said roller elements resiliently for vertical relatively independent yielding movements relative to the frame on which they are mounted.

3. In a vehicle, a main frame, a wheel supported subframe, means supporting said main frame on said subframe and pivotally connecting the latter to said main frame for steering and transverse rocking movements about a center in horizontally fixed relation to said main frame, and means interposed between said main frame and said subframe for resiliently holding said subframe in a predetermined angular relation to a vertical axis through said center, said interposed means including a circular roller track arranged on said main frame concentrically with said vertical axis, roller elements disposed at opposite sides of said vertical axis and engaging said track, and means for mounting said roller elements on said subframe, said mounting means sustaining said roller elements resiliently for vertical relatively independent yielding movements relative to said subframe.

4. In a vehicle, a main frame, a wheel supported subframe, means supporting said main frame on said subframe and pivotally connecting the latter to said main frame for steering and transverse rocking movements about a center in horizontally fixed relation to said main frame, a circular roller track mounted on one of said frames concentrically with an axis through said center, a leaf spring extending transversely to said axis and connected intermediate its ends to the other of said frames at a portion of the latter adjacent to said axis, and rollers associated with opposite ends of said leaf spring and urged by the latter against said track so as to yieldingly hold said subframe in a predetermined angular relation to a vertical axis through said center.

5. In a vehicle, a main frame, a wheel supported subframe, means supporting said main frame on said subframe and pivotally connecting the latter to said main frame for steering and transverse rocking movements about a center in horizontally fixed relation to said main frame, a circular roller track mounted on one of said frames concentrically with an axis through said center, a leaf spring extending transversely to said axis and connected intermediate its ends to the other of said frames at a portion of the latter adjacent to said axis, and barrel shaped rollers associated with opposite ends of said leaf spring and having axes of rotation radially disposed with respect to said axis, said leaf spring urging said rollers against said track so as to yieldingly hold said subframe in a predetermined angular relation to a vertical axis through said center.

6. In a vehicle, a main frame, a wheel supported subframe, means supporting said main frame on said subframe and connecting the latter to said main frame for pivotal movement about a vertical axis and for angular displacement with respect to said vertical axis, a circular roller track mounted on said main frame concentrically with said vertical axis, a leaf spring secured intermediate its ends to said subframe and extending in opposite directions from a plane passing, in the longitudinal direction of the vehicle, through said vertical axis, and rollers associated with opposite ends of said leaf spring and urged by the latter against said track.

7. In a vehicle, a main frame, a wheel supported subframe, means supporting said main frame on said subframe and connecting the latter to said main frame for pivotal movement about a vertical axis and for angular displacement with respect to said vertical axis, a circular roller track mounted on said main frame, a leaf spring forwardly of said vertical axis, and a leaf spring rearwardly of said axis, each of said leaf springs being secured intermediate its ends to said subframe and extending in opposite directions from a plane passing, in the longitudinal direction of the vehicle, through said vertical axis, and rollers associated with opposite ends of said leaf springs and urged by the latter against said track.

8. In a vehicle, a main frame, a wheel supported subframe, means supporting said main frame on said subframe and connecting the latter to said main frame for pivotal movement about a vertical axis and for angular displacement with respect to said vertical axis, a circular roller track mounted on one of said frames concentrically with said vertical axis, a leaf spring extending transversely to said vertical axis and connected intermediate its ends to the other of said frames, rollers associated with opposite ends of said leaf spring and urged by the latter against said track, and coil springs associated with said rollers and the frame supporting said leaf spring, said coil springs assisting said leaf spring in urging said rollers against said track.

9. In a vehicle, a main frame, a wheel supported subframe, means supporting said main frame on said subframe and pivotally connecting the latter to said main frame for steering and transverse rocking movements about a center in horizontally fixed relation to said main frame, a circular roller track mounted on one of said frames concentrically with a vertical axis through said center, vertically disposed coil springs forwardly of said vertical axis, vertically disposed coil springs rearwardly of said axis, said coil springs being mounted on one of said frames at opposite sides of a vertical plane passing, longitudinally of the vehicle, through said vertical axis, a roller support yieldingly sustained by the coil springs at one side of said plane, a roller support yieldingly sustained by the coil springs at the other side of said plane, rollers mounted on said supports for cooperation with said track, and means for guiding said supports during compression of said coil springs, said guiding means including elements connected to said roller supports and, near said vertical plane, to the frame on which said coil springs are mounted, and extending transversely to said vertical plane in angularly movable relation to the latter.

10. In a vehicle, a main frame, a wheel supported subframe, means supporting said main frame on said subframe and pivotally connecting the latter to said main frame for steering and transverse rocking movements about a center in horizontally fixed relation to said main frame, a circular roller track mounted on said main frame concentrically with a vertical axis through said center, vertically disposed coil springs mounted on said subframe at opposite sides of a vertical plane passing, longitudinally of the vehicle, through said vertical axis, roller supports yieldingly sustained by said coil springs, rollers mounted on said supports for cooperation with said track, and means for guiding said supports during compression of said coil springs, said guiding means including a flexible element extending transversely to said vertical plane and connected at its opposite ends to said roller supports and intermediate its ends, near said vertical plane, to said subframe.

11. In a vehicle, a main frame, a wheel supported axle, means supporting said main frame on said axle and pivotally connecting the latter to said main frame for steering and transverse rocking movements about a center in horizontally fixed and vertically movable relation to said main frame, resilient means cooperating with said main frame and said axle so as to urge said axle upwardly against said main frame, and means cooperating, independently of said supporting means, with said main frame and said axle for resiliently holding said axle in a predetermined angular relation to a vertical axis through said center.

12. In a vehicle, a main frame, a wheel supported subframe, means supporting said main frame on said subframe and pivotally connecting the latter to said main frame for steering and transverse rocking movements about a center in horizontally fixed and vertically movable relation to said main frame, resilient means cooperating with said main frame and said subframe for urging said subframe upwardly against said main frame, a circular roller track mounted on one of said frames concentrically with an axis through said center, vertical coil springs mounted on the other of said frames at opposite sides of said axis, and rollers associated with said coil springs and urged by the latter against said track so as to yieldingly hold said subframe in a predetermined angular relation to a vertical axis through said center.

13. In a vehicle, a main frame, a wheel supported subframe, means supporting said main frame on said subframe and pivotally connecting the latter to said main frame for steering and transverse rocking movements about a center in horizontally fixed and vertically movable relation to said main frame, resilient means cooperating with said main frame and said subframe for urging said subframe upwardly against said main frame, a circular roller track mounted on said main frame concentrically with a vertical axis through said center, vertical coil springs mounted on said subframe at opposite sides of a vertical plane passing, longitudinally of the vehicle, through said vertical axis, roller supports yieldingly sustained by said coil springs, and rollers mounted on said supports and urged by said coil springs against said track so as to yieldingly hold said subframe in a predetermined angular relation to said vertical axis.

14. In a vehicle, a main frame, a vertically disposed tubular member securely mounted on said main frame, a second tubular member telescopically and rotatably associated with said first tubular member and having a portion abutting against a portion of said first tubular member from below, means associated with said tubular members for resiliently holding the abutting surfaces thereof against each other, a wheel supported subframe connected to said second tubular member for a pivotal movement about an axis at right angles and in transversely fixed relation to the common axis of said tubular members, and means interposed between said main frame and said subframe for resiliently holding said subframe in a predetermined angular relation to the common axis of said tubular members, said interposed means including a circular roller track arranged on one of said frames concentrically with said common axis, roller elements disposed at opposite sides of said common axis and engaging said track, and means for mounting said roller elements on the other frame, said mounting means sustaining said roller elements resiliently for vertical relatively independent yielding movements relative to the frame on which they are mounted.

15. In a vehicle, a main frame, a vertically disposed cylindrical tubular member secured to said main frame, a thrust plate secured to an upper portion of said tubular member, a second cylindrical tubular member telescopically and rotatably associated with said first tubular member, a thrust plate secured to the upper end of said second tubular member and abutting against the thrust plate of said first tubular member, and a wheel supported subframe pivotally connected to the lower end of said second tubular member for angular displacement relative to the common axis of said tubular members.

16. In a vehicle, a main frame, a wheel supported subframe, means supporting said main frame on said subframe and pivotally connecting the latter to said main frame for transverse rocking movements about a center in horizontally fixed relation to said main frame, and means interposed between said main frame and said subframe for resiliently holding said subframe in a predetermined angular relation to a vertical axis through said center, said interposed means including an abutment on one of said frames, elements bearing against said abutment, and means for mounting said elements on the other frame at opposite sides of said vertical axis, said mounting means retaining said elements resiliently for relatively independent yielding movements relative to the frame on which they are mounted.

17. In a vehicle, a main frame, a wheel supported subframe, means supporting said main frame on said subframe and pivotally connecting the latter to said main frame for transverse rocking movements about a center in horizontally fixed and vertically movable relation to said main frame, and means cooperating, independently of said supporting means, with said main frame and said subframe for resiliently holding said subframe in a predetermined angular relation to a vertical axis through said center.

18. In a vehicle, a main frame, a wheel supported subframe, means pivotally connecting said subframe to said main frame for steering and transverse rocking movements about a center in horizontally fixed relation to said main frame, and means interposed between said main frame and said subframe for resiliently holding said subframe in a predetermined angular relation to a vertical axis through said center, said interposed means including an abutment on one of said frames, elements bearing against said abutment, and means for mounting said elements on the other frame at opposite sides of said vertical axis, said mounting means retaining said elements resiliently for relatively independent yielding movements relative to the frame on which they are mounted.

19. In a vehicle, a main frame, a wheel supported subframe, means pivotally connecting said subframe to said main frame for steering and transverse rocking movements about a center in horizontally fixed and vertically movable relation to said main frame, and means interposed between said main frame and said subframe for resiliently holding said subframe in a predetermined angular relation to a vertical axis through said center, said interposed means including an abutment on one of said frames, elements bearing against said abutment, and means for mounting said elements on the other frame at opposite sides of said vertical axis, said mounting means retaining said elements resiliently for relatively independent yielding movements relative to the frame on which they are mounted.

20. In a vehicle, a main frame, a wheel supported subframe, means pivotally connecting said subframe to said main frame for transverse rocking movements about a center in horizontally fixed relation to said main frame, and means interposed between said main frame and said subframe for resiliently holding said subframe in a predetermined angular relation to a vertical axis through said center, said interposed means including an abutment on one of said frames, elements bearing against said abutment, and means for mounting said elements on the other frame at opposite sides of said vertical axis, said mounting means retaining said elements resiliently for relatively independent yielding movements relative to the frame on which they are mounted.

21. In a vehicle, a main frame, a wheel supported subframe, means pivotally connecting said subframe to said main frame for transverse rocking movements about a center in horizontally fixed and vertically movable relation to said main frame, and means cooperating with said main frame and said subframe for resiliently holding said subframe in a predetermined angular relation to a vertical axis through said center.

22. In a vehicle, a main frame, a wheel supported subframe, a member guided on one of said frames for reciprocating movements relative thereto, a pivotal connection between said member and the other frame, having a fixed center of movement on the latter, said subframe being arranged for pivotal transverse rocking movements about an axis in transversely fixed relation to said center, an element having a bearing surface laterally of said fixed center, a second element adapted to bear against said bearing surface of said first element, means connecting one of said elements with said main frame, means connecting the other element with said subframe and holding it thereon in engagement with said first member when said subframe is in its normal horizontal position, one of said connecting means being flexible so as to accommodate said pivotal movements of said subframe, and resilient means associated with said flexible connecting means for yieldingly holding said subframe in said normal horizontal position, said reciprocable member and the one of said relatively engaging elements which is associated with said flexible connecting means being movable relative to each other so as to permit sliding movement of said reciprocable member relative to its associated frame upon excessive rocking movements of said subframe.

WILLIAM E. YUNKER.